United States Patent
Lienemann et al.

(10) Patent No.: US 8,069,713 B2
(45) Date of Patent: Dec. 6, 2011

(54) METHOD FOR EVALUATING THE PLAUSIBILITY OF A PRESSURE DIFFERENCE VALUE DETERMINED ACROSS A PARTICLE FILTER

(75) Inventors: Holger Lienemann, München (DE); Tahar Zrilli, Regensburg (DE)

(73) Assignee: Continental Automotive GmbH, Hannover (DE)

(*) Notice: Subject to any disclaimer, the term of this patent is extended or adjusted under 35 U.S.C. 154(b) by 157 days.

(21) Appl. No.: 12/523,893

(22) PCT Filed: Jan. 21, 2008

(86) PCT No.: PCT/EP2008/050645
§ 371 (c)(1), (2), (4) Date: Jan. 7, 2010

(87) PCT Pub. No.: WO2008/090125
PCT Pub. Date: Jul. 31, 2008

(65) Prior Publication Data
US 2010/0139382 A1    Jun. 10, 2010

(30) Foreign Application Priority Data
Jan. 22, 2007 (DE) .......................... 10 2007 003 153

(51) Int. Cl.
*G01M 15/10* (2006.01)
(52) U.S. Cl. .................................................. 73/114.76
(58) Field of Classification Search ............... 73/114.75, 73/114.76
See application file for complete search history.

(56) References Cited

U.S. PATENT DOCUMENTS

| | | | | |
|---|---|---|---|---|
| 5,511,413 A * | 4/1996 | Pfister et al. | ............... | 73/114.69 |
| 7,127,347 B2 | 10/2006 | Moser et al. | | |
| 7,147,693 B2 * | 12/2006 | Inoue et al. | .................... | 95/273 |
| 7,637,140 B2 * | 12/2009 | Reichl | ............................ | 73/1.57 |
| 7,650,781 B2 * | 1/2010 | Keski-Hynnila et al. | .. | 73/114.76 |
| 7,793,538 B2 * | 9/2010 | Kariya et al. | ............... | 73/114.69 |
| 7,797,926 B2 * | 9/2010 | Nishino et al. | .................. | 60/277 |
| 2006/0005534 A1 | 1/2006 | Wirth et al. | | |
| 2006/0080028 A1 | 4/2006 | Moser et al. | | |
| 2008/0215205 A1* | 9/2008 | Kariya et al. | .................... | 701/29 |
| 2009/0193904 A1* | 8/2009 | Takahashi et al. | ............... | 73/716 |

FOREIGN PATENT DOCUMENTS

| | | |
|---|---|---|
| DE | 102004011065 A1 | 9/2005 |
| DE | 102004033412 A1 | 2/2006 |
| DE | 102004040924 A1 | 3/2006 |
| EP | 1564386 A1 | 8/2005 |
| GB | 2400444 A | 10/2004 |
| WO | WO 02073011 A1 | 9/2002 |
| WO | WO 2005085619 A1 | 9/2005 |

OTHER PUBLICATIONS

Robert Bosch GmbH, "Dieselmotor-Management", 4. Auflage Friedr. Vieweg & Sohn Verlag, 2004, p. 414, ISBN: 3-528-23873-9.
German Office Action, German application No. 10 2007 003 153.1-26, 4 pages, Jul. 13, 2007.
International PCT Search Report, PCT/EP2008/050645, 11 pages, May 30, 2008.

* cited by examiner

*Primary Examiner* — Freddie Kirkland, III
(74) *Attorney, Agent, or Firm* — King & Spalding L.L.P.

(57) ABSTRACT

In a method for achieving plausibility of a pressure difference value by means of a particle filter, a pressure difference value is allocated to each charging pressure of the internal combustion engine. As a result, the identification of a faulty pressure difference value occurs when the detected pressure difference value is outside a limit range of the detected charging pressure value.

13 Claims, 1 Drawing Sheet

METHOD FOR EVALUATING THE PLAUSIBILITY OF A PRESSURE DIFFERENCE VALUE DETERMINED ACROSS A PARTICLE FILTER

CROSS-REFERENCE TO RELATED APPLICATIONS

This application is a U.S. National Stage Application of International Application No. PCT/EP2008/050645 filed Jan. 21, 2008, which designates the United States of America, and claims priority to German Application No. 10 2007 003 153.1 filed Jan. 22, 2007, the contents of which are hereby incorporated by reference in their entirety.

TECHNICAL FIELD

The invention relates to a method for evaluating the plausibility of a pressure difference value determined across a particle filter.

BACKGROUND

With diesel engines, particle filters can be used to reduce soot emissions. In such cases a regeneration of the particle filter has to be carried out once it has been filled with soot up to a certain limit, in order to prevent a blockage of the particle filter with the accompanying exhaust gas counter pressure and the risk of an uncontrolled combustion of soot in the filter.

A pressure difference sensor is used in order to enable the blockage of the particle filter with soot to be measured. Said pressure difference sensor measures the pressure difference between the two ends of the particle filter. A high-pressure difference value indicates a high blockage of the particle filter, while a low-pressure difference value is rather a sign of an empty particle filter. Based on the pressure difference value and on the specific engine operating point, a charging value of the particle filter can then be calculated. The charging value can then be used, amongst others, to evaluate the effectiveness of a regeneration, and if necessary further measures can be introduced.

Since there is legislation governing monitoring of the functionality of each component, which directly or indirectly carries out emission-relevant functions, the quality of the pressure difference value has to be monitored continuously. Should the quality of the pressure difference value deteriorate, the quality of the pressure difference value determined in each case will therefore also automatically deteriorate. A deterioration in the pressure difference value can in particular lead to the particle filter being either regenerated too frequently or too seldom. A too frequent regeneration results in an increased fuel consumption and a too seldom regeneration can adversely affect the driving behavior and the emission behavior.

SUMMARY

According to various embodiments, a method for achieving a quick plausibility check can be made available that is as simple and easy as possible of the pressure difference value determined.

According to an embodiment, a method for evaluating the plausibility of a pressure difference which takes place between the two ends of a particle filter arranged in the exhaust zone of an internal combustion engine, by using a first measuring unit in order to determine the pressure difference value and a second measuring unit which determines a charging pressure of the internal combustion engine, may comprise the steps of allocating a charging pressure value of the internal combustion engine to each pressure difference value and storing the two characteristic values in a characteristic map, and identifying an incorrect pressure difference value at the time when the measured pressure difference value lies outside a predeterminable upper limit range and a lower limit range for the stored pressure difference value of the internal combustion engine that is allocated in each case to the charging pressure determined.

According to a further embodiment, the charging pressure of the internal combustion engine determined may be checked for plausibility before the plausibility of the determined pressure difference sensor is checked. According to a further embodiment, there may be a linear correlation between the pressure difference value determined and the charging pressure determined.

BRIEF DESCRIPTION OF THE DRAWINGS

Details of the invention are described in greater depth below with reference to the schematic figures of the drawings, in which.

DETAILED DESCRIPTION

The advantages achieved with various embodiments consist in particular of the plausibility check of the pressure difference value being achieved in a simpler manner by means of an observation of the charging pressure value of the internal combustion engine and provides more accurate results than achieving a direct plausibility of the pressure difference value at the pressure difference sensor. The method hence provides more accurate and relatively simple measurable information about the quality of the pressure difference value.

Figure 1:
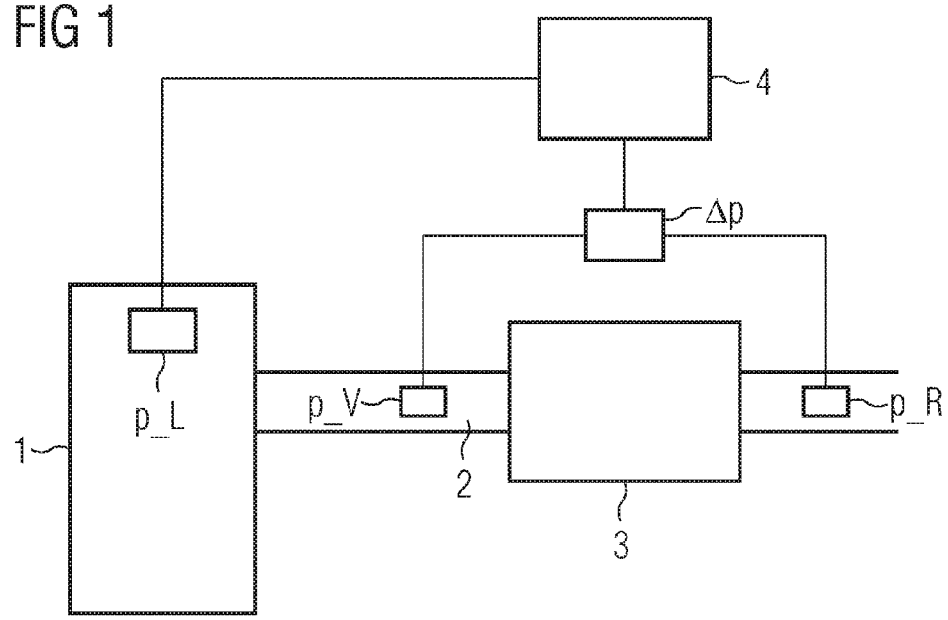
FIG. 1: shows a block diagram for plausibility checking of the pressure difference value.

FIG. 1 shows a block diagram for plausibility checking of the pressure difference value across a particle filter 3. For this purpose, a particle filter 3 is arranged in the exhaust zone 2 of an internal combustion engine 1. The arrangement in addition has a pressure difference sensor, which sends a pressure difference value $\Delta p$ determined to the control unit 4. In this process, the pressure difference $\Delta p$ corresponds to the pressure difference between pressure $p\_v$ of the exhaust gas before it enters into the particle filter 3 and pressure $p\_n$ of the exhaust gas after its exit from the particle filter 3. The control unit 4 also receives a continuous signal $p\_L$, which corresponds to the charging pressure of the internal combustion engine.

The method for plausibility checking of the pressure difference value $\Delta p$ is described in more detail below. A characteristic map is stored in the control device 4 in which a charging pressure value $p\_L$, as a function of the operating mode of the internal combustion engine is allocated to each pressure difference value $\Delta p$. This allocation was determined in experiments under the condition that it was guaranteed that no soot forms in the particle filter 3. The plausibility of a pressure difference value $\Delta p$ is thus checked in the control device 4 while an incorrect pressure difference value $\Delta p$ is identified when the pressure difference value $\Delta p$ lies outside an upper limit range and a lower limit range around the pressure difference that can be assumed, to which the determined charging pressure value p_L is allocated. In this process, the upper limit range and the lower limit range correspond to a tolerance range of the pressure difference sensor, within which a pressure difference value determined can fluctuate, without it being identified inaccurately.

In this process, a plausibility of the pressure difference value determined at the pressure difference sensor is checked subsequent to checking a plausibility of the charging pressures of the internal combustion engine determined. Only in this way can it be guaranteed that a correct and accurate plausibility check of the pressure difference value takes place.

Figure 2:
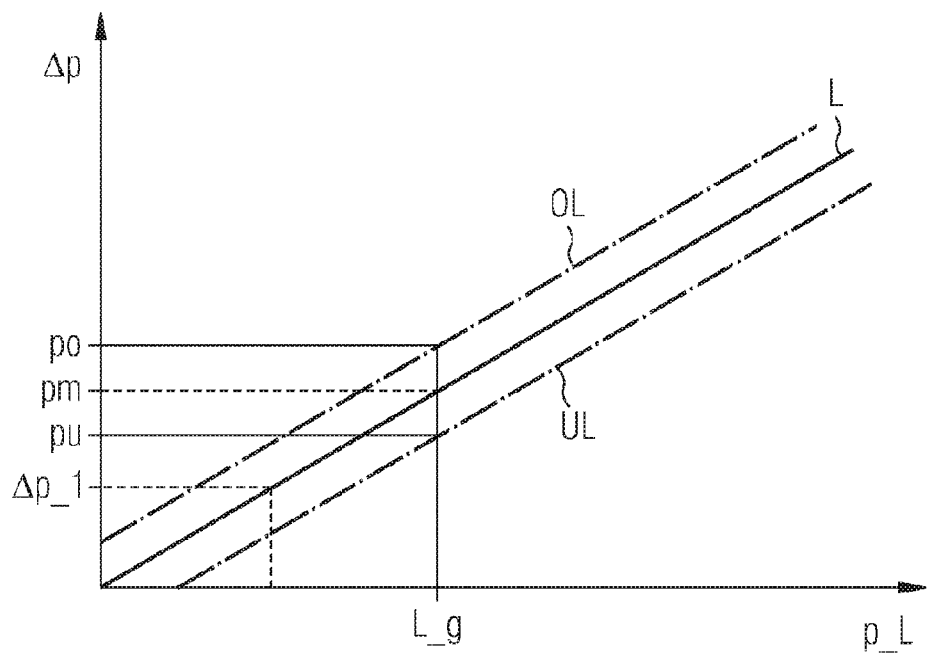
FIG. 2: shows the correlation between the charging pressure of the internal combustion engine and the pressure difference across a particle filter.

FIG. 2 shows the correlation between the charging pressure p_L of the internal combustion engine and the pressure difference across a particle filter. In this process, the abscissa represents the charging pressure of the internal combustion engine and the ordinate the pressure difference value $\Delta p$ across the particle filter. In this case, a linear correlation L between the pressure difference value $\Delta p$ and the charging pressure value p_L is represented for a defined operating mode of the internal combustion engine. However, other correlations between the two pressure values are also entirely conceivable. In this process, the linear correlation is within a limit range, which is determined by a predeterminable upper limit OL and a predeterminable lower limit UL. In this case, the upper limit range and the lower limit range in addition represent the tolerance range within which the pressure difference value may be found without an incorrect pressure value signal being identified.

In the case considered, a charging pressure of the internal combustion engine L_g is determined. This charging pressure L_g, sets a limit range on the basis of the characteristic map determined in experiments, within which the pressure difference value determined must lie. In this process, a pressure difference value pm is allocated to the charging pressure in the case considered here, based on the characteristic map stored in the control device. The limit range is determined by means of a predetermined upper limit OL and by means of a predetermined lower limit UL around the pressure difference value pm. The pressure difference value $\Delta p1$ determined at the pressure difference sensor must therefore lie within the pressure range which is established by means of the limit values po and pu, so that the pressure difference value is not identified as being incorrect. In the present case, the pressure difference value $\Delta p1$ is outside the range limited by the limit values po and pu. The pressure difference value $\Delta p1$ is in this way identified by the control unit 4 as being incorrect and further measures are introduced.

What is claimed is:

1. A method for evaluating the plausibility of a pressure difference which takes place between the two ends of a particle filter arranged in the exhaust zone of an internal combustion engine, by using a first measuring unit in order to determine the pressure difference value and a second measuring unit which determines a charging pressure of the internal combustion engine, the method comprising the steps of:
    allocating a charging pressure value of the internal combustion engine to each pressure difference value and storing the two characteristic values in a characteristic map, and
    identifying an incorrect pressure difference value at the time when the measured pressure difference value lies outside a predeterminable upper limit range and a lower limit range for the stored pressure difference value of the internal combustion engine that is allocated in each case to the charging pressure determined.

2. The method according to claim 1, wherein the charging pressure of the internal combustion engine determined is checked for plausibility before the plausibility of the determined pressure difference sensor is checked.

3. The method according to claim 1, wherein there is a linear correlation between the pressure difference value determined and the charging pressure determined.

4. A method for evaluating the plausibility of a pressure difference between the two ends of a particle filter arranged in the exhaust zone of an internal combustion engine, comprising the steps of:
    determining pressure difference values;
    determining charging pressure values of the internal combustion engine,
    allocating a charging pressure value to each pressure difference value and storing the two characteristic values in a characteristic map, and
    identifying an incorrect pressure difference value at the time when the measured pressure difference value lies outside a predetermined window defined by an upper limit range and a lower limit range for the stored pressure difference value that is allocated in each case to the charging pressure determined.

5. The method according to claim 4, wherein the charging pressure of the internal combustion engine determined is checked for plausibility before the plausibility of the determined pressure difference sensor is checked.

6. The method according to claim 4, wherein there is a linear correlation between the pressure difference value determined and the charging pressure determined.

7. A system for evaluating the plausibility of a pressure difference between the two ends of a particle filter arranged in the exhaust zone of an internal combustion engine, comprising:
    a first measuring unit for determining the pressure difference value and a second measuring unit for determining a charging pressure of the internal combustion engine;
    wherein the system is operable to allocate a charging pressure value to each pressure difference value, to store the two characteristic values in a characteristic map, and to identify an incorrect pressure difference value at the time when the measured pressure difference value lies outside a predetermined window defined by an upper limit range and a lower limit range for the stored pressure difference value that is allocated in each case to the charging pressure determined.

8. The system according to claim 7, wherein the charging pressure of the internal combustion engine determined is checked for plausibility before the plausibility of the determined pressure difference sensor is checked.

9. The system according to claim 7, wherein there is a linear correlation between the pressure difference value determined and the charging pressure determined.

10. The system according to claim 7, wherein the particle filter is arranged in the exhaust zone of an internal combustion engine.

11. The system according to claim 7, comprising a pressure difference sensor coupled to a control unit.

12. The system according to claim 11, wherein the pressure difference sensor determines a pressure difference between a pressure of the exhaust gas before it enters into the particle filter and pressure of the exhaust gas after its exit from the particle filter.

13. The system according to claim 7, wherein the control unit receives a continuous signal which corresponds to the charging pressure of the internal combustion engine.

* * * * *